US012010647B2

(12) United States Patent
Verdon et al.

(10) Patent No.: US 12,010,647 B2
(45) Date of Patent: Jun. 11, 2024

(54) METHOD AND SYSTEM FOR KEEPING A FIRST USER AND A SECOND USER CONTINUOUSLY INFORMED OF THEIR RESPECTIVE EMOTIONAL STATES

(71) Applicant: SWATCH AG, Bienne (CH)

(72) Inventors: Yann Verdon, Villars-sur-Glâne (CH); Andrea Rossi, Lainate (IT); Selim Salame, Gals (CH); Jean-Marc Koller, Yverdon-les-Bains (CH); Edoardo Franzi, Cheseaux-Noreaz (CH)

(73) Assignee: SWATCH AG, Bienne (CH)

( * ) Notice: Subject to any disclaimer, the term of this patent is extended or adjusted under 35 U.S.C. 154(b) by 231 days.

(21) Appl. No.: 17/559,168

(22) Filed: Dec. 22, 2021

(65) Prior Publication Data

US 2023/0199710 A1   Jun. 22, 2023

(51) Int. Cl.
H04W 68/00 (2009.01)
G06F 3/14 (2006.01)
G06T 11/00 (2006.01)

(52) U.S. Cl.
CPC ............ *H04W 68/005* (2013.01); *G06F 3/14* (2013.01); *G06T 11/00* (2013.01)

(58) Field of Classification Search
CPC ....... H04W 68/005; H04W 12/50; G06F 3/14; G06T 11/00
USPC ...................................................... 340/815.4
See application file for complete search history.

(56) References Cited

U.S. PATENT DOCUMENTS

| 10,122,756 | B1* | 11/2018 | Kelly ................. G06Q 20/3276 |
| 11,038,684 | B2 | 6/2021 | Shah et al. |
| 2015/0287403 | A1 | 10/2015 | Holzer Zaslansky et al. |
| 2016/0381534 | A1* | 12/2016 | Kwon .................... H04N 23/61 |
| | | | 455/556.1 |
| 2021/0249113 | A1* | 8/2021 | Molesworth ........ G06F 21/6245 |
| 2023/0199710 | A1* | 6/2023 | Verdon ................... G06T 11/00 |
| | | | 340/815.4 |

FOREIGN PATENT DOCUMENTS

KR    10-2015-0072020 A    6/2015

OTHER PUBLICATIONS

Russian Office Action dated Aug. 7, 2023 in Application No. 2022133688/28.

(Continued)

*Primary Examiner* — Omar Casillashernandez
(74) *Attorney, Agent, or Firm* — Sughrue Mion, PLLC

(57) ABSTRACT

A method for keeping a first user and a second user continuously informed of each other's emotional state is provided. The method includes: pairing a first connected watch of the first user with a second connected watch of the second user; receiving, by the second connected watch, an emotional notification comprising a graphical representation relating to an emotional state of the first user; and displaying the graphical representation on a first region of a watch face of the second connected watch, and indicating a current time in a second region of the watch face, wherein the first region occupies a display area of a display of the second connected watch.

7 Claims, 2 Drawing Sheets

(56) References Cited

OTHER PUBLICATIONS

"Digital Touch, or how to send animated drawings, pulse (heartbeat), kiss, etc. to Apple Watch", 2019, Found at: https://web.archive.org/web/20190626211906/https://yablyk.com/356889-watchos-digital-touch-how-work/ (8 pages total).
Liu et al., "Animo: Sharing Biosignals on a Smartwatch for Lightweight Social Connection", Proc. ACM Interact. Mob. Wearable Ubiquitous Technol., 2019, vol. 3, No. 1, pp. 1-19 (19 pages total).

* cited by examiner

METHOD AND SYSTEM FOR KEEPING A FIRST USER AND A SECOND USER CONTINUOUSLY INFORMED OF THEIR RESPECTIVE EMOTIONAL STATES

FIELD

Embodiments of the present disclosure relate to a method for keeping a first user and a second user continuously informed of their respective emotional states through a display of their connected watch, and a system for keeping a first user and a second user continuously informed of their respective emotional states, implementing such a method.

BACKGROUND

Thanks to technical progress, connected watches have become more functional. Examples of such functions include data and voice communications, capturing images and video via a camera, recording audio, playing music files via a speaker system, and displaying images and video on a display.

These connected watches thus allow their users to receive different types of alerts, such as phone calls, social network updates, emails, text messages, and the like. In general, the user is notified of an event through a warning (such as sound effects and vibrations by the mobile device), and the warnings can be identified according to the preset settings of the watch or preset by the user. For example, the user may select one type of alert to identify the receipt of a text message and another alert type to identify the receipt of the email.

SUMMARY

In this context, embodiments of the present disclosure provide an alternative to the existing technologies illustrated by the different uses made of these watches.

To this end, embodiments of the present disclosure include a method for keeping a first user and a second user continuously informed of their respective emotional states through a display of their connected watch, the method comprising:
  a step of pairing a first user's connected watch with a second user's connected watch;
  a step of receiving by the first or second user's connected watch an emotional notification comprising a graphical representation relating to an emotional state;
  a step of displaying the graphical representation on a first region of a watch face occupying an entire display area of the said display and indicating a current time in a second region of this watch face
In other embodiments of the present disclosure:
  the step of pairing comprises a sub-step of interacting between a first user's mobile device and a second user's mobile device respectively connected to the first user's connected watch and the second user's connected watch;
  the step of pairing comprises a sub-step of interacting between the first user's connected watch and the second user's connected watch;
  the sub-step of interacting comprises a phase of exchanging pairing identifiers between the first user's connected watch and the second user's connected watch after carrying out a phase of detecting a shock between these first and second user's connected watches;
  the sub-step of interacting comprises a phase of authorizing the first user's connected watch and the second user's connected watch to exchange emotional notification with each other, this phase including a sub-phase of associating the first user pairing identifier with the second user pairing identifier;
  the step of displaying comprises a sub-step of dynamically positioning the graphical representation in the first region relatively to at least one graphical object comprised in the watch face;
  the step of receiving (116) comprises a sub-step of designing this emotional notification received including a phase of manual generation of this emotional notification;
  the step of receiving comprises a sub-step of designing this emotional notification received including a phase of automatic generation of this emotional notification.

Embodiments of the present disclosure include a system for keeping a first user and a second user continuously informed of their respective emotional states through the display of their connected watch performing this method, the system comprising a communication environment 5 for transmitting data between a first user's connected watch and a second user's connected watch, this communication environment 5 including a first user's mobile device connected to the first user's connected watch and a second user's mobile device connected to second user's connected watch, the said first and second user's mobile devices being also connected to a server of this communication environment 5.

Embodiments of the present disclosure include a non-transitory computer readable medium having stored thereon instructions for causing first and second user's connected watches, first and second user's mobile devices, and a server to perform this method.

Embodiments of the present disclosure include a computer program, optionally stored on a medium, comprising instructions for causing first and second user's connected watches, first and second user's mobile devices, and a server to perform this method

BRIEF DESCRIPTION OF THE DRAWINGS

Non-limiting example embodiments of the present disclosure will be described subsequently in more detail with reference to the attached drawing, in which.

DETAILED DESCRIPTION

Figure 1:
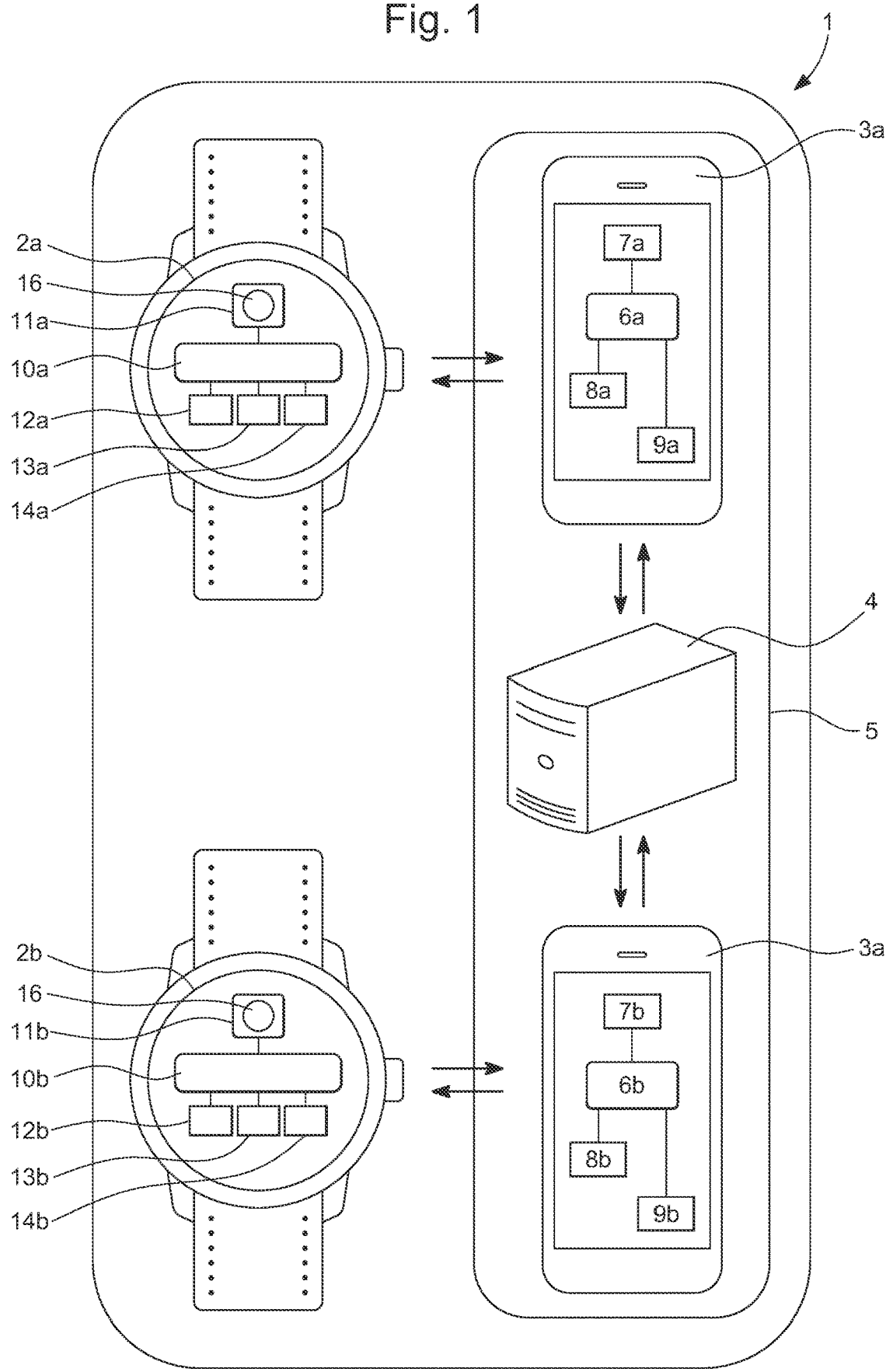
FIG. 1 is a schematic diagram illustrating a system for keeping a first user and a second user continuously informed of their respective emotional states through the display of their connected watch, according to an embodiment of the present disclosure.
Figure 2:
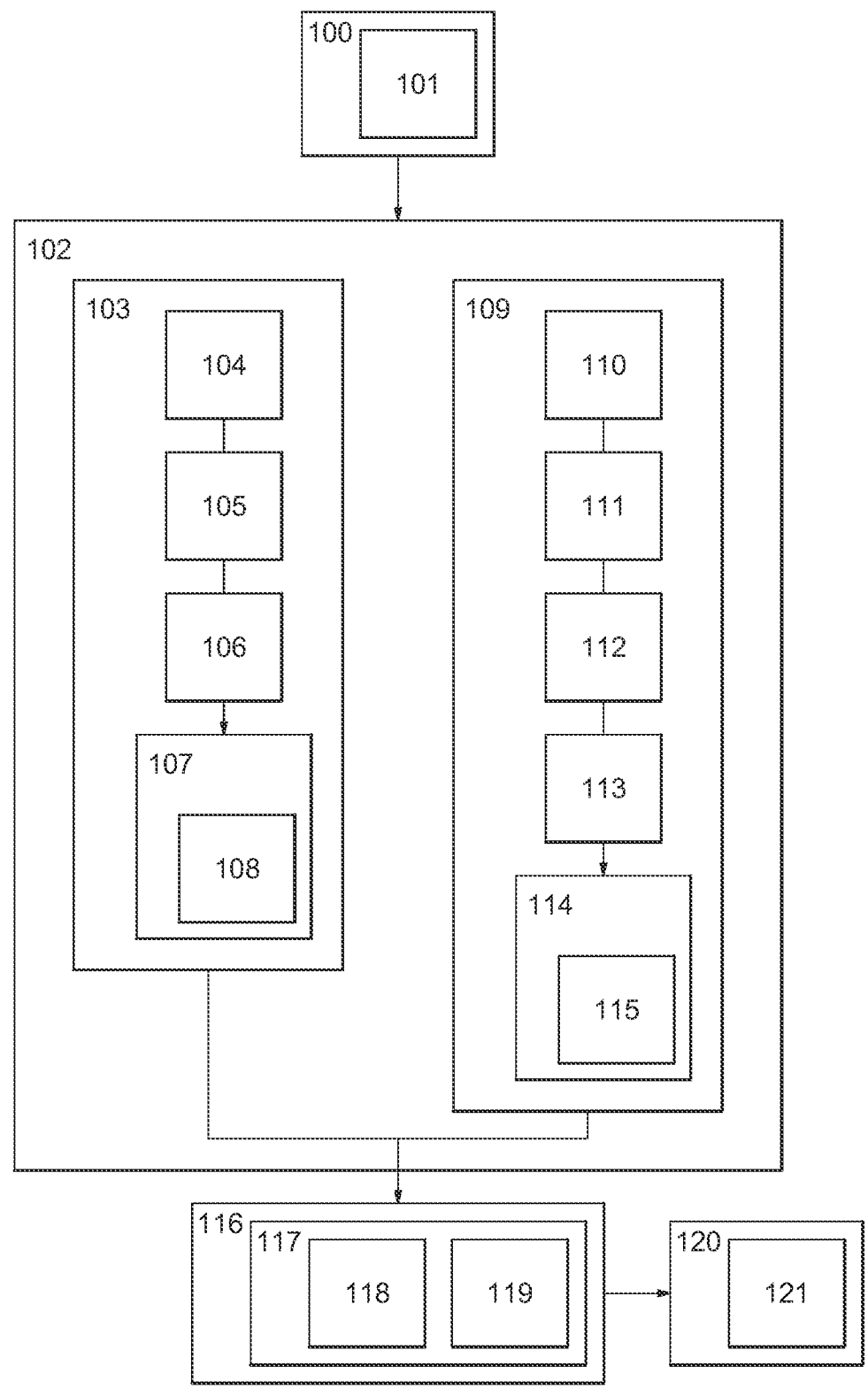
FIG. 2 is a flowchart relating to a method for keeping the first user and the second user continuously informed of their respective emotional states, according to the embodiment of the present disclosure.

With reference to FIGS. 1 and 2, a system 1 and a method for keeping a first user and a second user continuously informed of their respective emotional states through the display of their connected watch 2a, 2b, is described. These system 1 and method allow the first and the second users to keep abreast of their respective emotional states by simply looking at the display of their connected watch 2a, 2b without having to perform any other action.

Referring to FIG. 1, the system 1 comprises the first user's connected watch 2a and the second user's connected watch 2b and also an communication environment 5 for transmitting data between the first user's connected watch 2a and the second user's connected watch 2b.

In this system 1, the first user's connected watch 2a is associated with the first user and a second user's connected watch 2b is associated with the second user, each user's connected watch 2a, 2b includes a body such as a watch case, and an attachment element such as a wristlet allowing to fasten this body, for example to the wrist of the first user or second user. More specifically, each user's connected watch 2a, 2b comprises in a non-limiting and/or non-exhaustive manner:
- a processing unit 10a, 10b (also referred to as a "controller") including hardware and software resources, in particular at least one processor cooperating with memory elements;
- an interface for broadcasting 11a, 11b a visual piece of information such as a digital display;
- an interface for broadcasting an audio piece of information such as a loudspeaker;
- a wireless communication interface (for example cellular, WLAN Bluetooth, etc.);
- an input interface 12a, 12b such as a touch interface comprised in, for example, the interface for broadcasting a visual piece of information;
- a shock sensor 13a, 13b comprising an acceleration sensor and/or a magnetic sensor and/or a G-sensor and/or a gyroscope sensor and/or a motion sensor;
- a microphone, and
- a bio-information sensor 14a, 14b measuring the bio-information of the wearer.

In each connected watch 2a, 2b, the processing unit 10a, 10b is connected, among others, to the interfaces for broadcasting a visual and sound piece of information, to the input interface, to the microphone as well as to the wireless communication interface and to the bio-information sensor 14a, 14b. According to embodiments, the bio-information sensor 14a, 14b can be arranged in the caseback of the connected watch 2a, 2b and/or in the attachment element.

As previously specified, the bio-information sensor measures the bio-information of the wearer. This bio-information is mainly related to various emotional factors connected with the behavioural and physiological characteristics of the wearer. In this context, the bio-information comprises several categories of emotional factor enumerated hereafter in a non-limiting and non-exhaustive way: breathing, amount of sweat, heartbeat, breathing, wink, eye-ball movement, gazing time, pupil diameter, blood pressure, brain wave, body movement, posture, skin temperature, galvanic skin response (GSR), micro-vibration (MV), electro-myography (EMG), and blood oxygen saturation (SPO2). These categories of emotional factor may be measured by cardiographic measurement units, EMG measurement units, head electrical voltage measurement units, infrared image intensity analyses, pressure sensors, temperature sensors, or sweating sensors. According to embodiments, the bio-information sensor 14a, 14b is configured to be supported by the wearer at a location such that it can detect this emotional factor for example the wearer's heartbeats or worn by the wearer at a location where it is in contact with the wearer's skin, and as such is able to measure parameters such as resistance In this system 1, the communication environment 5 comprises a first user's mobile device 3a and a second user's mobile device 3b and a server 4. This communication environment 5 also comprises a wireless or wired network architecture connecting the mobile devices 3a, 3b, the connected watches 2a, 2b and the server 4 together.

In this system 1, the server 4 (e.g. a remote server) includes a database. This server 4 also comprises a control unit (e.g. a controller) and a communication unit (e.g. a communicator). In this server 4, the control unit includes hardware and software resources, in particular at least one processor cooperating with memory components. This control unit is capable of executing instructions for implementing a computer program to, for example:
- manage database of server 4, process the queries/instructions/data coming/sent to/from the mobile devices 3a, 3b, particularly to/from the processing units 6a, 6b thereof;
- implement pairing procedures between at least two connected watches 2a, 2b;
- manage the exchanges of emotional notifications 16 between at least two connected watches 2a, 2b.

Furthermore, the first user's mobile device 3a is associated with the first user and the second user's mobile device 3b is associated with a second user. Each user's mobile device 3a, 3b can comprise, for example: a computer, a smartphone or even a tablet. Each mobile device 3a, 3b includes, in a non-limiting and/or non-exhaustive manner:
- the processing unit 6a, 6b (also referred to as a "controller") including hardware and software resources, in particular at least one processor cooperating with memory elements;
- a display module 7a, 7b such as a screen displaying a visual representation of information data;
- an interface for audio information transmission, such as a loudspeaker;
- a communication interface allowing each mobile device 3a, 3b to establish a communication connection with the server 4 or with each connected watch 2a, 2b;
- a selection interface 8a, 8b such as a keyboard or even a touch-sensitive interface; and
- at least one audio stream capture module comprising at least one microphone;
- a module for capturing/acquiring 9a, 9b at least one image, in particular comprising at least one image sensor.

In each mobile device 3a, 3b, the processing unit 6a, 6b is connected, inter alia, to the broadcast interface, to the communication interface, to the acquisition module, and to the selection interface. The communication interface of each mobile device 3a, 3b comprises communication elements for receiving and transmitting data remotely via the cellular telephone network, a data network of the IP type via the telephone network, or a data network of the IP type via a medium-range network, for example WI-FI or a short-range network implementing Bluetooth technology.

In addition, this processing unit 6a, 6b is connected, among other things, to the display module, to the transmission interface, to the communication interface, and to selection interface. This processing unit 6a, 6b is capable in particular of executing instructions for implementing the computer program instructions to process, for example, the queries/instructions/data being received/sent:
- to/from server 4, particularly to/from control unit thereof, and/or
- to/from the processing unit 10a,10b of the first or second user's connected watch 2a, 2b.

Furthermore, the processing unit 6a, 6b of each mobile device 3a, 3b is able to execute a computer program also called an application or apps. More precisely, in this context the application is an "application of emotional state". This application, when the processing unit 6a, 6b executes it, is able to participate in implementation of part of the steps of the method described below.

Referring now to FIG. 2, the system 1 is capable of implementing the method for keeping a first user and a second user continuously informed of their respective emotional states through the display of their connected watch 2a, 2b.

Such a method starts with a step of establishing 100 a connection with the communication environment 5. To do this, that step includes a sub-step of connecting 101 the first user's connected watch 2a and the second user's connected watch 2b with respectively the first user's mobile device 3a and the second user's mobile device 3b. During this sub-step 101, the processing units 10a, 10b, 6a, 6b of the each connected watch 2a, 2b and each mobile device 3a, 3b connect to each other by means of their communication interface preferably by using the Bluetooth™ protocol.

Once this connection is established, the application of emotional state is active on each mobile device 3a, 3b and is able to exchange data with the processing unit 10a, 10b of each connected watch 2a, 2b and also with the server 4. In other words, the application is active as soon as the processing unit 6a, 6b of each mobile device 3a, 3b detects that the connection is establish between each connected watch 2a, 2b and each corresponding mobile device 3a, 3b.

The purpose of this step of establishing 100 a connection is to allow the first user's connected watch 2a and the second user's connected watch 2b to exchange data through the communication environment 5 particularly with the server 4 when they are not paired with each other.

Then, the method comprises a step of pairing 102 the first user's connected watch 2a with the second user's connected watch 2b. This step 102 contributes to create a communication link between these connected watches 2a, 2b in order to allow them to exchange data, (e.g. emotional messages), through the communication environment 5. Step 102 may be provided by at least two embodiments of pairing between the watches.

In a first embodiment, this step 102 comprises a sub-step of interacting 103 between the first user's mobile device 3a and the second user's mobile device 3b. This sub-set 103 includes a phase of displaying 104 a graphical representation comprising a matrix code on the display of the first user's mobile device 3a. This matrix code may be a bar code in two or three dimensions. This matrix code may for example comprise a QR code or a datamatrix code. This matrix code comprises sequences of binary information that are encoded/encrypted. In this graphical representation, the matrix code comprises sequences of binary information including data relating to the first user's connected watch 2a more specifically a first user pairing identifier. Then sub-set 103 comprises a phase of digitisation 105 by the second user's mobile device 3b of the graphical representation comprising the matrix code. During, this phase 105, this graphical representation is acquired as soon as the second user's mobile device 3b is arranged in the immediate vicinity of the first user's mobile device 3a so that its capture module 9b is disposed opposite this graphical representation. Afterwards, this sub-set 103 includes a phase of decoding 106 the matrix code so as to obtain binary information sequences comprising data relating to the first user pairing identifier for implementing pairing.

Subsequently, the sub-step 103 includes a phase of authorizing 107 the first user's connected watch 2a and the second user's connected watch 2b to exchange emotional messages with each other. This phase 107 includes a sub-phase of associating 108 the first user pairing identifier with the second user pairing identifier. During this sub-phase 108 the processing unit 10b of the second user's mobile device 3b executing the application, transmits to the server 4, a request to configure the association of the first user pairing identifier with the second user pairing identifier. In the communication environment 5, this server 4 manages the exchanges of emotional notifications 16.

In the second embodiment, this step 102 comprises a sub-step of interacting 109 between the first user's connected watch 2a and the second user's connected watch 2b. This sub-set 109 includes a phase of activating 110 a pairing function of the first user's connected watch 2a and the second user's connected watch 2b. During this phase 110, the processing unit 10a, 10b of each connected watch 2a, 2b receives an activation signal of pairing function, linked to a touch input on its touch interface by the corresponding user (first or second). Afterwards, the sub-set 109 comprises a phase of detecting a shock 111 between the first user's connected watch 2a and the second user's connected watch 2b. During this phase 111, the processing unit 10a, 10b of each of the first and the second connected watches 2a, 2b receives a signal from the shock sensor 13a, 13b when these two connected watches 2a, 2b hit each other. Then, the sub-set 109 comprises a phase of exchanging 112 pairing identifiers between the first user's connected watch 2a and the second user's connected watch 2b. Furthermore, the sub-set 109 comprises a phase of transmitting 113 the pairing identifiers received by the first user's connected watch 2a and the second user's connected watch 2b to respectively the first user's mobile device 3a and the second user's mobile device 3b to which they are connected.

Then, the sub-set 109 includes a phase of authorizing 114 the first user's connected watch 2a and the second user's connected watch 2b to exchange emotional notification with each other. This phase 114 includes a sub-phase of associating 115 the first user pairing identifier with the second user pairing identifier. During this sub-phase 115, the processing unit 6a, 6b of each of the first and the second user's mobile devices 3a, 3b executing the application, transmits to the server 4 a request to configure the association of the first user pairing identifier with the second user pairing identifier. As we mentioned previously, in the communication environment 5, this server 4 manages the exchanges of emotional notifications 16.

Furthermore, the method comprises a step of receiving 116 by the first or second user's connected watch 2a, 2b an emotional notification comprising a graphical representation relating to an emotional state. In other words, the processing unit 10a of the first user's connected watch 2a (or the second user's connected watch 2b), receives this emotional notification from the processing unit 10b of the second user's connected watch 2b (or the first user's connected watch 2a).

This step 116 comprises a sub-step of designing 117 the emotional notification to be received. This sub-step 117 includes a phase of manual generation 118 of this emotional notification. During this phase 118, the processing unit 10a, 10b of the first or second user's connected watch 2a, 2b can receives from its touch interface a signal of selection of a graphical representation relating to the emotional state of the first or second user. Indeed, this first or second user can choose/select a graphical representation displayed on the display of his connected watch 2a, 2b, which corresponds to his emotional state. Once the graphical representation has been selected, the processing unit 10a, 10b generates the notification in anticipation of the transmission of this graphical representation.

Alternatively, this sub-step 117 includes a phase of automatic generation 119 of this emotional notification. During this phase 119, the processing unit 10a, 10b of the first or second user's connected watch 2a, 2b can receive a signal from the bio-information sensor 14a, 14b comprising measurement data linked to at least one bio-information. Then, the processing unit 10a, 10b, 6a, 6b of this connected watch 2a, 2b or of the mobile device 3a, 3b with which it is connected, can implement an algorithm for determining an emotional state of the first or second user, which is applied to these measurement data. More precisely, this processing unit 10a, 10b, 6a, 6b executing this algorithm can monitor the measurement data stream provided by this sensor 14a, 14b and identify a change related to an emotional state. Once the emotional state has been identified, the processing unit 10a, 10b can select from its memory elements a graphical representation corresponding to this emotional state and then generates the notification in anticipation of the transmission of this graphical representation.

Furthermore, the method comprises a step of displaying 120 the graphical representation (corresponding to the emotional state) on a first region of a watch face occupying an entire display area of the display of the connected watch 2a, 2b and indicating a current time in a second region. In this connected watch 2a, 2b, this watch face is a graphical representation of a dial displayed on the digital display of this watch 2a, 2b. This step 120 comprises a sub-step of dynamically positioning 121 the graphical representation in the first region relatively to at least one graphical object comprised in the watch face. A graphical object in this watch face is, for example, an icon linked to an activation/deactivation of a function of this connected watch 2a, 2b, a graphical representation, an information displayed in this watch face (temperature, moon phase, number of steps, heart rate, etc. . . . ), the first region comprising the current time, etc. . . . . During this sub-step 121, the processing unit 10a, 10b of the first or second user's connected watch 2a, 2b implements a digital image processing algorithm which is capable of detecting said at least one graphical object and of achieving the positioning of the first region with respect to said at least one graphical object taking into account the following criteria:

graphical dimension of the graphical representation relating to the emotional state;
variation of the graphical dimension when the graphical representation is animated;
graphical dimension of the at least one graphical object of the watch face;
location of the at least one graphical object of the watch face;
location in the watch face of the at least one graphical object;
the colour (s) of said at least one graphic object;
etc. . . . .

Thus this step of displaying makes it possible to guarantee optimum visibility of the graphical representation related to the emotional state in the watch face by distinguishing it in particular from the at least one graphical object of this watch face.

It will be apparent to those skilled in the art that various modifications may be made in the present disclosure, without departing from the spirit or the scope of the disclosure. Thus, it is intended that the present disclosure cover modifications and variations of embodiments of the present disclosure.

The invention claimed is:

1. A method for keeping a first user and a second user continuously informed of each other's emotional state, the method comprising:
   pairing a first connected watch of the first user with a second connected watch of the second user by exchanging pairing identifiers between the first connected watch and the second connected watch after detecting a shock between the first connected watch and the second connected watch;
   receiving, by the second connected watch, an emotional notification comprising a graphical representation relating to an emotional state of the first user; and
   displaying the graphical representation on a first region of a watch face of the second connected watch, and indicating a current time in a second region of the watch face of the second connected watch, wherein the first region occupies a display area of a display of the second connected watch.

2. The method according to claim 1, wherein the pairing comprises interacting between a first mobile device of the first user and a second mobile device of the second user that are respectively connected to the first connected watch and the second connected watch.

3. The method according to claim 1, wherein the pairing further comprises authorizing the first connected watch and the second connected watch to exchange emotional notifications with each other, the authorizing comprising transmitting a request to associate the pairing identifiers with each other.

4. The method according to claim 1, wherein the displaying comprises dynamically positioning the graphical representation in the first region relative to at least one graphical object comprised in the watch face.

5. A method for keeping a first user and a second user continuously informed of each other's emotional state, the method comprising:
   pairing a first connected watch of the first user with a second connected watch of the second user by exchanging pairing identifiers between the first connected watch and the second connected watch after detecting a shock between the first connected watch and the second connected watch;
   designing an emotional notification including a graphical representation relating to an emotional state of the first user, wherein the emotional notification is automatically generated based on a stored algorithm in the first connected watch; and
   sending, by the first connected watch to the second connected watch, the emotional notification.

6. A system for keeping a first user and a second user continuously informed of each other's emotional state, the system comprising:
   a first connected watch of the first user, the first connected watch configured to:
   pair with a second connected watch of the second user by exchanging pairing identifiers between the first connected watch and the second connected watch after detecting a shock between the first connected watch and the second connected watch;
   receive, from the second connected watch, an emotional notification comprising a graphical representation relating to an emotional state of the second user; and
   display the graphical representation on a first region of a watch face of the first connected watch, and indicate a current time in a second region of the watch face, wherein the first region occupies a display area of a display of the first connected watch; and a first mobile device of the first user that is configured to be connected to the first connected watch and a server, the first mobile device configured to transmit data between the first connected watch and the second connected watch via the server.

7. A non-transitory computer-readable medium storing computer instructions configured to cause at least one processor of a first connected watch of a first user to:

pair with a second connected watch of a second user by exchanging pairing identifiers between the first connected watch and the second connected watch after detecting a shock between the first connected watch and the second connected watch;

receive, from the second connected watch via a first mobile device of the first user that is connected to a server, an emotional notification comprising a graphical representation relating to an emotional state of the second user; and display the graphical representation on a first region of a watch face of the first connected watch, and indicate a current time in a second region of the watch face, wherein the first region occupies a display area of a display of the first connected watch.

\* \* \* \* \*